United States Patent
Mejdrich et al.

(10) Patent No.: US 7,868,894 B2
(45) Date of Patent: Jan. 11, 2011

(54) OPERAND MULTIPLEXOR CONTROL MODIFIER INSTRUCTION IN A FINE GRAIN MULTITHREADED VECTOR MICROPROCESSOR

(75) Inventors: Eric Oliver Mejdrich, Rochester, MN (US); Adam James Muff, Rochester, MN (US); Matthew Ray Tubbs, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 603 days.

(21) Appl. No.: 11/564,072

(22) Filed: Nov. 28, 2006

(65) Prior Publication Data

US 2008/0122854 A1    May 29, 2008

(51) Int. Cl.
*G06T 1/00* (2006.01)
(52) U.S. Cl. .................. 345/522; 345/418; 345/501; 345/502; 345/503; 345/504; 345/505; 345/506
(58) Field of Classification Search .......... None
See application file for complete search history.

(56) References Cited

U.S. PATENT DOCUMENTS 6,009,516 A * 12/1999 Steiss et al. ............... 712/244
6,141,673 A * 10/2000 Thayer et al. ............. 708/402
2001/0010604 A1* 8/2001 Esumi ....................... 360/49

OTHER PUBLICATIONS

Title: Group 2: SMIPS Multimedia Extensions, Author: King et al., Date: May 2006, pp. 1-21, Source: http://csg.csail.mit.edu/6.375/6_375_2010_www/projects.html.*

* cited by examiner

*Primary Examiner*—Kee M Tung
*Assistant Examiner*—Jwalant Amin
(74) *Attorney, Agent, or Firm*—Patterson & Sheridan, LLP

(57) ABSTRACT

The present invention is generally related to the field of image processing, and more specifically to an instruction set for processing images. Vector processing may involve rearranging vector operands in one or more source registers prior to performing vector operations. Typically, rearranging of operands in source registers is done by issuing a plurality of permute instructions that require excessive usage of temporary registers. Furthermore, the permute instructions may cause dependencies between instructions executing in a pipeline, thereby adversely affecting performance. Embodiments of the invention provide a level of muxing between a register file and a vector unit that allow for rearrangement of vector operands in source registers prior to providing the operands to the vector unit, thereby obviating the need for permute instructions.

21 Claims, 11 Drawing Sheets

| | INSTRUCTION | CC1 | CC2 | CC3 | CC4 | CC5 | CC6 | CC7 | CC8 | CC9 |
|---|---|---|---|---|---|---|---|---|---|---|
| 1302 → | SWIZZLE INSTRUCTION 1 | X | | | | | | | | |
| 902 → | $V_{MUL}$  $V_9, V_1, V_3$ | | X | X | X | X | | | | |
| 1303 → | SWIZZLE INSTRUCTION 2 | | | X | | | | | | |
| 903 → | $V_{MSUB}$  $V_{10}, V_5, V_9, V_7$ | | | | S | S | X | X | X | X |

$$\text{Fig. 5} \begin{cases} A = (x_a, y_a, z_a) \\ B = (x_b, y_b, z_b) \\ N = A \times B = \begin{vmatrix} \hat{x} & \hat{y} & \hat{z} \\ x_a & y_a & z_a \\ x_b & y_b & z_b \end{vmatrix} = \begin{matrix} \hat{x}(y_a z_b - y_b z_a) + \\ \hat{y}(x_b z_a - x_a z_b) + \\ \hat{z}(x_a y_b - x_b y_a) \end{matrix} \end{cases}$$

```
      ⎧  vperm  v1, v2         # move into the desired position for the first mult
      ⎪  vperm  v3, v4         # move into the desired position for the first mult
  901 ⎨  vperm  v5, v6         # for second mult
      ⎪  vperm  v7, v8         # for second mult
      ⎩
  902 ──→ vmul   v9, v1, v3    # first multiply
  903 ──→ vmsub  v9, v1, v3    # second multiply and substract step
```

Fig. 9

| INSTR | CC1 | CC2 | CC3 | CC4 | CC5 | CC6 | CC7 | CC8 | CC9 | CC10 | CC11 | CC12 | CC13 |
|---|---|---|---|---|---|---|---|---|---|---|---|---|---|
| V_PERM V$_1$,V$_2$ | x | | | | | | | | | | | | |
| V_PERM V$_3$,V$_4$ | | x | x | | | | | | | | | | |
| V_PERM V$_5$,V$_6$ | | | x | x | | | | | | | | | |
| V_PERM V$_7$,V$_8$ | | | | x | x | | | | | | | | |
| V_MUL V$_9$,V$_1$,V$_3$ | | | | x | x | x | x | x | x | | | | |
| V_MSUB V$_{10}$,V$_5$,V$_9$,V$_7$ | | | | | s | s | s | s | s | x | x | x | x |

901: V_PERM rows; 902: V_MUL row; 903: V_MSUB row

| X' | Y' | Z' | W' |
|----|----|----|----|
| X | Y | Z | W |
| X | Y | W | Z |
| X | Z | Y | W |
| X | Z | W | Y |
| X | W | Y | Z |
| X | W | Z | Y |
| Y | X | Z | W |
| Y | X | W | Z |
| Y | Z | W | X |
| Y | Z | X | W |
| Y | W | X | Z |
| Y | W | Z | X |
| W | X | Y | Z |
| W | X | Z | Y |
| W | Y | X | Z |
| W | Y | Z | X |
| W | Z | X | Y |
| W | Z | Y | X |
| Z | X | W | Y |
| Z | X | Y | W |
| Z | Y | X | W |
| Z | Y | W | X |
| Z | W | X | Y |
| Z | W | Y | X |

| PRI OPCODE | Ax', Ay', Az', Aw' | Bx', By', Bz', Bw' | Cx', Cy', Cz', Cw' | SEC OPCODE |

1210 — 1231 — 1232 — 1233 — 1210

| INSTRUCTION | CC1 | CC2 | CC3 | CC4 | CC5 | CC6 | CC7 | CC8 | CC9 |
|---|---|---|---|---|---|---|---|---|---|
| SWIZZLE INSTRUCTION 1 | X | | | | | | | | |
| $V_{MUL}$ $V_9, V_1, V_3$ | | X | X | X | X | | | | |
| SWIZZLE INSTRUCTION 2 | | | | S | S | S | | | |
| $V_{MSUB}$ $V_{10}, V_5, V_9, V_7$ | | | | | | X | X | X | X |

1302 — 902 — 1303 — 903

OPERAND MULTIPLEXOR CONTROL MODIFIER INSTRUCTION IN A FINE GRAIN MULTITHREADED VECTOR MICROPROCESSOR

BACKGROUND OF THE INVENTION

1. Field of the Invention

The present invention is generally related to the field of image processing, and more specifically to an instruction set for processing images.

2. Description of the Related Art

The process of rendering two-dimensional images from three-dimensional scenes is commonly referred to as image processing. A particular goal of image rendering is to make two-dimensional simulations or renditions of three-dimensional scenes as realistic as possible. This quest for rendering more realistic scenes has resulted in an increasing complexity of images and innovative methods for processing the complex images.

Two-dimensional images representing a three-dimensional scene are typically displayed on a monitor or some type of display screen. Modern monitors display images through the use of pixels. A pixel is the smallest area of space which can be illuminated on a monitor. Most modern computer monitors use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One method for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two dimensional plane. Furthermore, the computational power required to render a scene with rasterization scales directly with an increase in the complexity of objects in the scene to be rendered. As image processing becomes more realistic, rendered scenes become more complex. Therefore, rasterization suffers as image processing evolves, because rasterization scales directly with complexity.

Another method for rendering a real world three-dimensional scene onto a two-dimensional monitor using pixels is called ray tracing. The ray tracing technique traces the propagation of imaginary rays, which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors, for example, the effect of light sources, are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two dimensional synthesis of the three-dimensional scene can be displayed on the computer screen to the viewer.

Ray tracing typically renders real world three dimensional scenes with more realism than rasterization. This is partially due to the fact that ray tracing simulates how light travels and behaves in a real world environment, rather than simply projecting a three dimensional shape onto a two dimensional plane as is done with rasterization. Therefore, graphics rendered using ray tracing more accurately depict on a monitor what our eyes are accustomed to seeing in the real world.

Furthermore, ray tracing also handles increasing scene complexity better than rasterization. Ray tracing scales logarithmically with scene complexity. This is due to the fact that the same number of rays may be cast into a scene, even if the scene becomes more complex. Therefore, ray tracing does not suffer in terms of computational power requirements as scenes become more complex unlike rasterization.

However, one major drawback of ray tracing is the large number of floating point calculations, and thus increased processing power, required to render scenes. This leads to problems when fast rendering is needed, for example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Image processing using, for example, ray tracing, may involve performing both vector and scalar math. Accordingly, hardware support for image processing may include vector and scalar units configured to perform a wide variety of calculations. The vector and scalar operations, for example, may trace the path of light through a scene, or move objects within a three-dimensional scene. A vector unit may perform operations, for example, dot products and cross products, on vectors related to the objects in the scene. A scalar unit may perform arithmetic operations on scalar values, for example, addition, subtraction, multiplication, division, and the like.

The vector and scalar units may be pipelined to improve performance. However, performing vector operations may involve performing multiple iterations of multiple instructions which may be dependent on each other. Such dependencies between instructions may reduce the efficiency of the pipelined units. For example, several pipeline stages may be left unused in order for a first instruction to complete prior to execution of a second instruction.

Furthermore, each vector unit may be coupled with a register file comprising the vector data processed by the vector unit. The vector data may be contained in one or more locations in one or more registers. Therefore, one or more instructions may be issued to rearrange the vector data in desired locations within a target register. The multiple instructions rearranging vector data may limit the efficiency of vector processing by consuming a significant portion of the issue bandwidth. Additionally, the one or more instructions rearranging vector data may be dependent on one another, thereby introducing further pipeline stalls and unused pipeline stages that further limit efficiency.

Moreover, rearranging vector data may require the use of multiple temporary registers. The use of large numbers of temporary registers introduces yet another inefficiency because it requires the construction of large register files that consume valuable space and limit processing of vector data based on the availability of registers.

Therefore, what is needed are more efficient methods, systems, and articles of manufacture for processing vector data.

SUMMARY OF THE INVENTION

The present invention is generally related to the field of image processing, and more specifically to an instruction set for processing images.

One embodiment of the invention provides a method of executing instructions. The method generally comprises setting controls of one or more multiplexors coupled with a register file and a vector unit, wherein the setting of the multiplexor controls is configured to determine an arrangement of content in one or more registers providing input to the vector unit. The method further comprises issuing an arithmetic instruction, wherein contents of registers associated with the arithmetic instruction are rearranged by the one or more multiplexors during transfer from the register file to the vector unit based on the setting of the multiplexor controls.

Another embodiment of the invention provides a controller generally configured to receive instructions generally comprising swizzle instructions and arithmetic instructions. Each swizzle instruction may be associated with an arithmetic instruction, wherein if the instruction is a swizzle instruction the controller is configured to set controls of one or more multiplexors coupled with a register file and a vector unit, wherein the setting of the multiplexor controls is configured to determine an arrangement of content in one or more registers providing input to the vector unit. If the instruction is an arithmetic instruction the controller is configured to allow transfer of contents of registers associated with the arithmetic instruction to the vector unit, wherein the contents are rearranged by the one or more multiplexors during transfer of the contents from the register file to the vector unit based on the setting of the multiplexor controls.

Yet another embodiment of the invention provides a system generally comprising a plurality of processors communicably coupled with one another, wherein each processor generally comprises a register file comprising a plurality of registers, at least one vector unit for executing arithmetic instructions, one or more multiplexors coupled with the register file and the at least one vector unit, wherein the multiplexors are configured to transfer contents of one or more registers in the register file to the at least one vector unit, and a controller configured to receive swizzle instructions and arithmetic instructions. Each swizzle instruction may be associated with an arithmetic instruction, wherein if the instruction is a swizzle instruction the controller is configured to set controls of the one or more multiplexors, wherein the setting of the multiplexor controls is configured to determine an arrangement of content in one or more registers providing input to the vector unit. If the instruction is an arithmetic instruction the controller is configured to allow transfer of contents of registers associated with the arithmetic instruction to the vector unit, wherein the contents are rearranged by the one or more multiplexors during transfer of the contents from the register file to the vector unit based on the setting of the multiplexor controls.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 illustrates a cross product operation.

FIG. 9 illustrates exemplary instructions for performing a cross product operation, according to an embodiment of the invention.

FIG. 10 illustrates pipelined execution of the instructions in FIG. 9, according to an embodiment of the invention.

FIG. 11B illustrates potential rearrangement of operands according to an embodiment of the invention.

DETAILED DESCRIPTION OF THE PREFERRED EMBODIMENTS

The present invention is generally related to the field of image processing, and more specifically to an instruction set for processing images. Vector processing may involve rearranging vector operands in one or more source registers prior to performing vector operations. Typically rearranging of operands in source registers is done by issuing a plurality of permute instructions that require excessive usage of temporary registers. Furthermore, the permute instructions may cause dependencies between instructions executing in a pipeline, thereby adversely affecting performance. Embodiments of the invention provide a level of muxing between a register file and a vector unit that allow for rearrangement of vector operands in source registers prior to providing the operands to the vector unit, thereby obviating the need for permute instructions.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary Processor Layout and Communications Network

Figure 1:
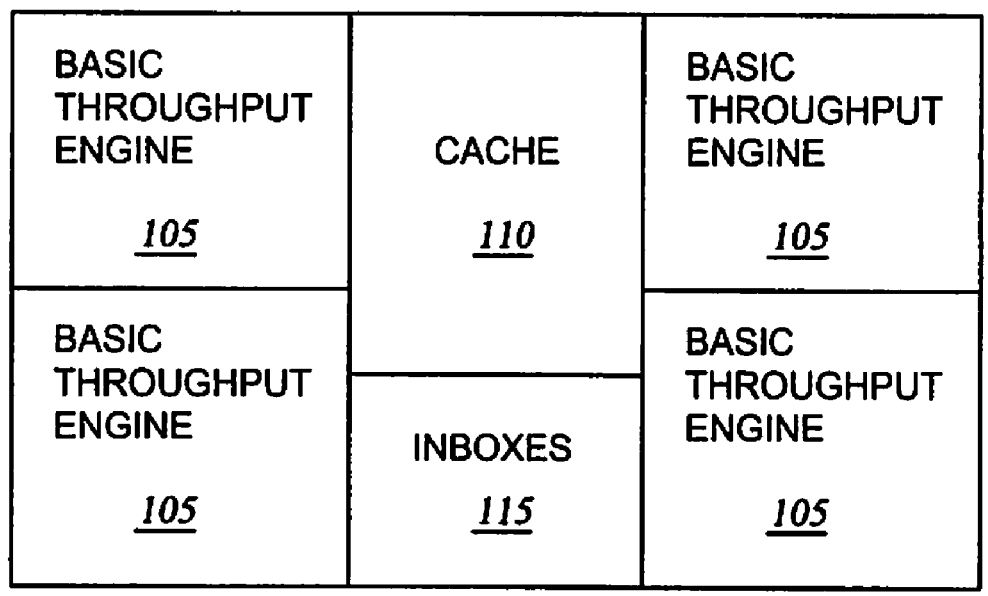
FIG. 1 illustrates a multiple core processing element, according to one embodiment of the invention.

FIG. 1 illustrates an exemplary multiple core processing element 100, in which embodiments of the invention may be implemented. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element cache 110 (e.g., an L2 cache).

The BTEs 105 may also have access to a plurality of inboxes 115. The inboxes 115 may be a memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low latency and high bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two dimensional image from a three dimensional scene. According to one embodiment of the invention, an image processing system may use a workload manager to traverse a spatial index with a ray issued by the image processing system. A spatial index may be implemented as a tree type data structure used to partition a relatively large three dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. The vector throughput engines may then determine if the ray intersects a primitive contained within the bounding volume. The vector throughput engines may also perform operations relating to determining the color of the pixel through which the ray passed.

Figure 2:
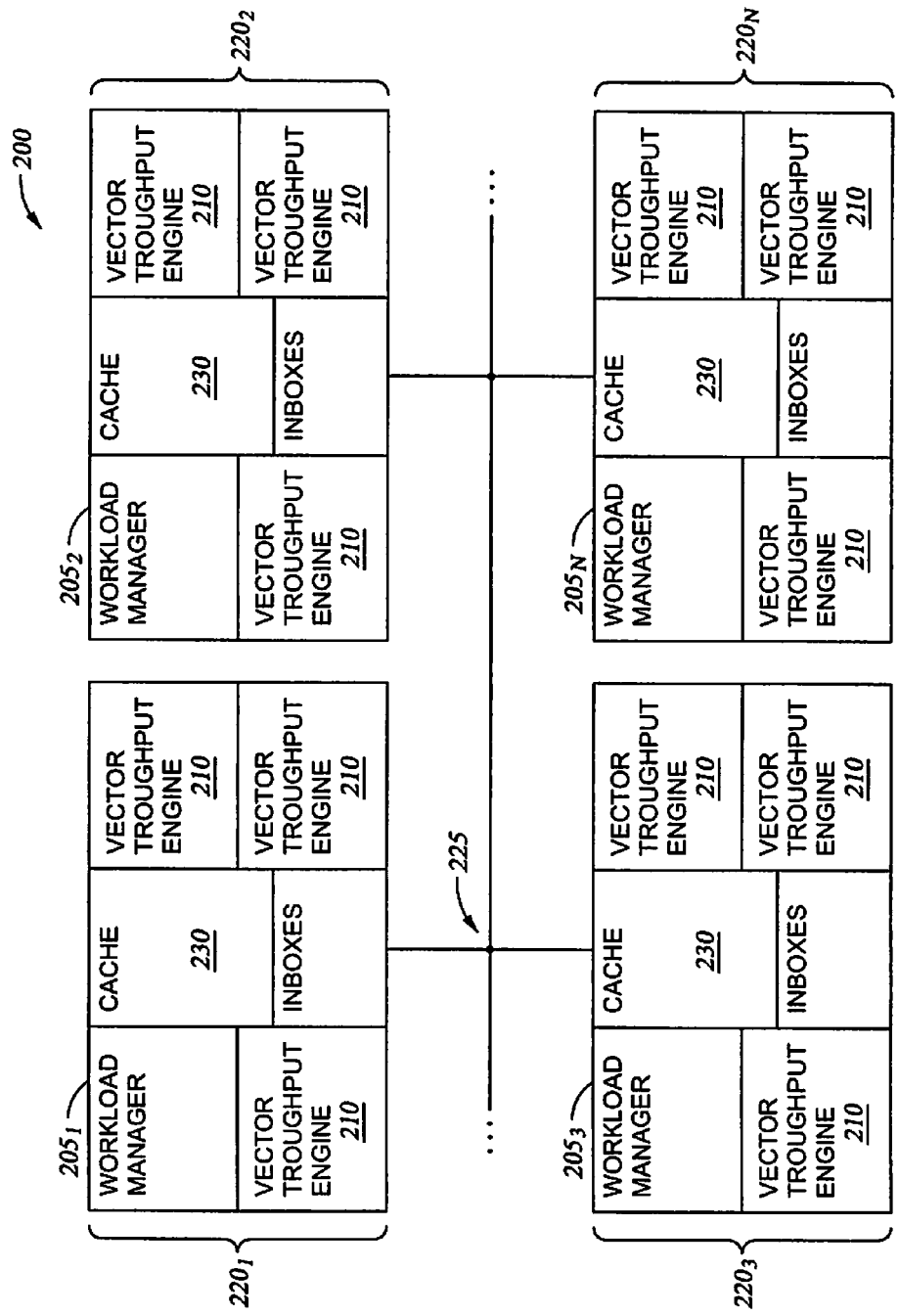
FIG. 2 illustrates a multiple core processing element network, according to an embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

An Exemplary Three Dimensional Scene

Figure 3:
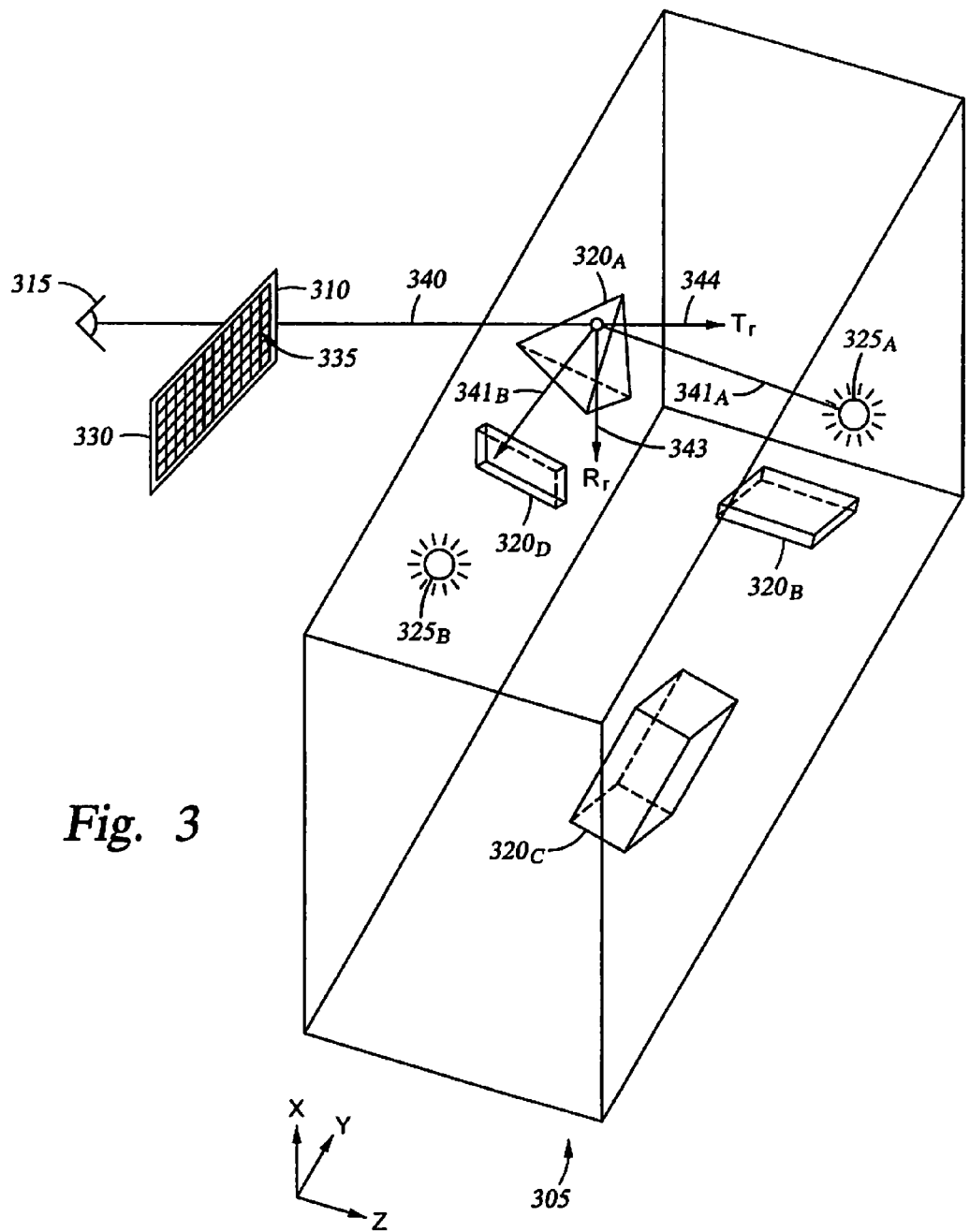
FIG. 3 is an exemplary three dimensional scene to be rendered by an image processing system, according to one embodiment of the invention.

FIG. 3 is an exemplary three dimensional scene 305 to be rendered by an image processing system. Within the three dimensional scene 305 may be objects 320. The objects 320 in FIG. 3 are of different geometric shapes. Although only four objects 320 are illustrated in FIG. 3, the number of objects in a typical three dimensional scene may be more or less. Commonly, three dimensional scenes will have many more objects than illustrated in FIG. 3.

As can be seen in FIG. 3 the objects are of varying geometric shape and size. For example, one object in FIG. 3 is a pyramid $320_A$. Other objects in FIG. 3 are boxes $320_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 305 are light sources $325_{A-B}$. The light sources may illuminate the objects 320 located within the scene 305. Furthermore, depending on the location of the light sources 325 and the objects 320 within the scene 305, the light sources may cause shadows to be cast onto objects within the scene 305.

The three dimensional scene 305 may be rendered into a two-dimensional picture by an image processing system. The image processing system may also cause the two-dimensional picture to be displayed on a monitor 310. The monitor 310 may use many pixels 330 of different colors to render the final two-dimensional picture.

One method used by image processing systems to render a three-dimensional scene 320 into a two dimensional picture is called ray tracing. Ray tracing is accomplished by the image processing system "issuing" or "shooting" rays from the perspective of a viewer 315 into the three-dimensional scene 320. The rays have properties and behavior similar to light rays.

One ray 340, that originates at the position of the viewer 315 and traverses through the three-dimensional scene 305, can be seen in FIG. 3. As the ray 340 traverses from the viewer 315 to the three-dimensional scene 305, the ray 340 passes through a plane where the final two-dimensional picture will be rendered by the image processing system. In FIG. 3 this plane is represented by the monitor 310. The point the ray 340 passes through the plane, or monitor 310, is represented by a pixel 335.

As briefly discussed earlier, most image processing systems use a grid 330 of thousands (if not millions) of pixels to render the final scene on the monitor 310. Each individual pixel may display a different color to render the final composite two-dimensional picture on the monitor 310. An image processing system using a ray tracing image processing methodology to render a two dimensional picture from a three-dimensional scene will calculate the colors that the issued ray or rays encounters in the three dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 335 in the two dimensional picture, the image processing system must determine if the ray 340 intersects an object within the scene. If the ray does not intersect an object within the scene it may be assigned a default background color (e.g., blue or black, representing the day or night sky). Conversely, as the ray 340 traverses through the three dimensional scene the ray 340 may strike objects. As the rays strike objects within the scene the color of the object may be assigned the pixel through which the ray passes. However, the color of the object must be determined before it is assigned to the pixel.

Many factors may contribute to the color of the object struck by the original ray 340. For example, light sources within the three dimensional scene may illuminate the object. Furthermore, physical properties of the object may contribute to the color of the object. For example, if the object is reflective or transparent, other non-light source objects may then contribute to the color of the object.

In order to determine the effects from other objects within the three dimensional scene, secondary rays may be issued from the point where the original ray 340 intersected the object. For example, one type of secondary ray may be a shadow ray. A shadow ray may be used to determine the contribution of light to the point where the original ray 340 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 305. If the ray reaches the light source without encountering another object before the ray reaches the light source, then the light source will illuminate the object struck by the original ray at the point where the original ray struck the object.

For example, shadow ray $341_A$ may be issued from the point where original ray 340 intersected the object $320_A$, and may traverse in a direction towards the light source $325_A$. The shadow ray $341_A$ reaches the light source $325_A$ without encountering any other objects 320 within the scene 305. Therefore, the light source $325_A$ will illuminate the object $320_A$ at the point where the original ray 340 intersected the object $320_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray $341_B$ may be issued from the point where the original ray 340 intersected with the object $320_A$, and may traverse in a direction towards the light source $325_B$. In this example, the path of the shadow ray $341_B$ is blocked by an object $320_D$. If the object $320_D$ is opaque, then the light source $325_B$ will not illuminate the object $320_A$ at the point where the original ray 340 intersected the object $320_A$. However, if the object $320_D$ which the shadow ray is translucent or transparent the light source $325_B$ may illuminate the object $320_A$ at the point where the original ray 340 intersected the object $320_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 344 is seen traversing through the object $320_A$ which the original ray 340 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 343 may be issued by the image processing system to determine what color or light may be reflected by the object $320_A$ which the original ray 340 intersected.

The total contribution of color and light of all secondary rays (e.g., shadow rays, transmitted rays, reflected rays, etc.) will result in the final color of the pixel through which the original ray passed.

Vector Operations

Processing images may involve performing one or more vector operations to determine, for example, intersection of rays and objects, generation of shadow rays, reflected rays, and the like. One common operation performed during image processing is the cross product operation between two vectors. A cross product may be performed to determine a normal vector from a surface, for example, the surface of a primitive of an object in a three dimensional scene. The normal vector may indicate whether the surface of the object is visible to a viewer.

Figure 4:
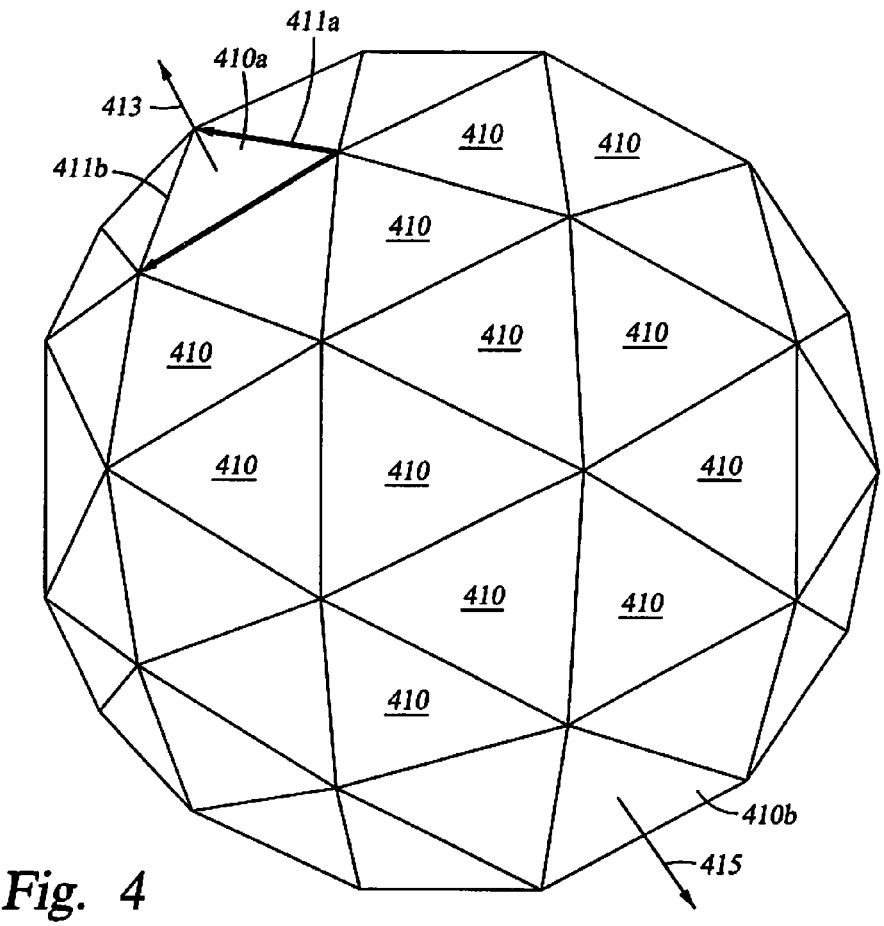
FIG. 4 illustrates a detailed view of an object to be rendered on a screen, according to an embodiment of the invention.

As previously described, each object in a scene may be represented as a plurality of primitives connected to one another to form the shape of the object. For example, in one embodiment, each object may be composed of a plurality of interconnected triangles. FIG. 4 illustrates an exemplary object 400 composed of a plurality of triangles 410. Object 400 may be a spherical object, formed by the plurality of triangles 410 in FIG. 4. For purposes of illustration a crude spherical object is shown. One skilled in the art will recognize that the surface of object 400 may be formed with a greater number of smaller triangles 410 to better approximate a curved object.

In one embodiment of the invention, the surface normal for each triangle 410 may be calculated to determine whether the surface of the triangle is visible to a viewer 450. To determine the surface normal for each triangle, a cross product operation may be performed between two vectors representing two sides of the triangle. For example, the surface normal 413 for triangle 410a may be computed by performing a cross product between vectors 411a and 411b.

The normal vector may determine whether a surface, for example, the surface of a primitive, faces a viewer. Referring to FIG. 4, normal vector 413 points in the direction of viewer 450. Therefore, triangle 410 may be displayed to the user. On the other hand, normal vector 415 of triangle 410b points away from viewer 450. Therefore, triangle 410b may not be displayed to the viewer.

FIG. 5 illustrates a cross product operation between two vectors A and B. As illustrated, vector A may be represented by coordinates $[x_a, y_a, z_a]$, and vector B may be represented by coordinates $[x_b, y_b, z_b]$. The cross product A×B results in a vector N that is perpendicular (normal) to a plane comprising vectors A and B. The coordinates of the normal vector, as illustrated are $[(y_a z_b - y_b z_a), (x_b z_a - x_a z_b), (x_a y_b - x_b y_a)]$. One skilled in the art will recognize that vector A may correspond to vector 411a in FIG. 4, vector B may correspond to vector 411b, and vector N may correspond to normal vector 413.

Another common vector operation performed during image processing is the dot product operation. A dot product operation may be performed to determine rotation, movement, positioning of objects in the scene, and the like. A dot product operation produces a scalar value that is independent of the coordinate system and represents an inner product of the Euclidean space. The equation below describes a dot product operation performed between the previously described vectors A and B:

$$A \cdot B = x_a \cdot x_b + y_a \cdot y_b + z_a \cdot z_b$$

Hardware Support for Performing Vector Operations

As described earlier, a vector throughput engine (VTE), for example VTE 210 in FIG. 2, may perform operations to determine whether a ray intersects with a primitive, and determine a color of a pixel through which a ray is passed. The operations performed may include a plurality of vector and scalar operations. Accordingly, VTE 210 may be configured to issue instructions to a vector unit for performing vector operations.

Figure 6:
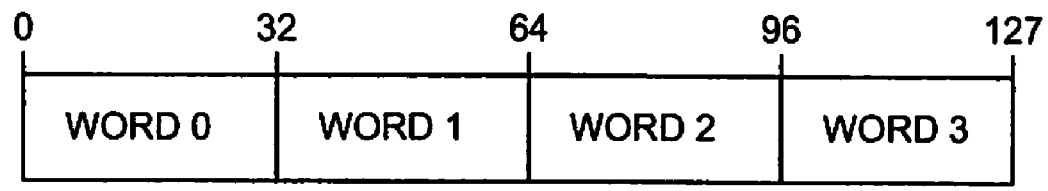
FIG. 6 illustrates a register according to an embodiment of the invention.

Vector processing may involve issuing one or more vector instructions. The vector instructions may be configured to perform operations involving one or more operands in one or more registers. The one or more registers may be a part of a register file associated with a vector unit. FIG. 6 illustrates an exemplary register 600 comprising one or more operands. As illustrated in FIG. 6, each register in the register file may comprise a plurality of sections, wherein each section comprises an operand.

In the embodiment illustrated in FIG. 6, register 600 is shown as a 128 bit register. Register 600 may be divided into four 32 bit word sections: word 0, word 1, word 2, and word 3, as illustrated. Word 0 may include bits 0-31, word 1 may include bits 32-63, word 2 may include bits 64-97, and word 3 may include bits 98-127, as illustrated. However, one skilled in the art will recognize that register 600 may be of any reasonable length and may include any number of sections of any reasonable length.

Each section in register 600 may include an operand for a vector operation. For example, register 600 may include the coordinates and data for a vector, for example vector A of FIG. 5. Accordingly, word 0 may include coordinate $x_a$, word 1 may include the coordinate $y_a$, and word 2 may include the coordinate $z_a$. Word 3 may include data related to a primitive associated with the vector, for example, color, transparency, and the like. In one embodiment, word 3 may be used to store scalar values. The scalar values may or may not be related to the vector coordinates contained in words 0-2.

Figure 7:
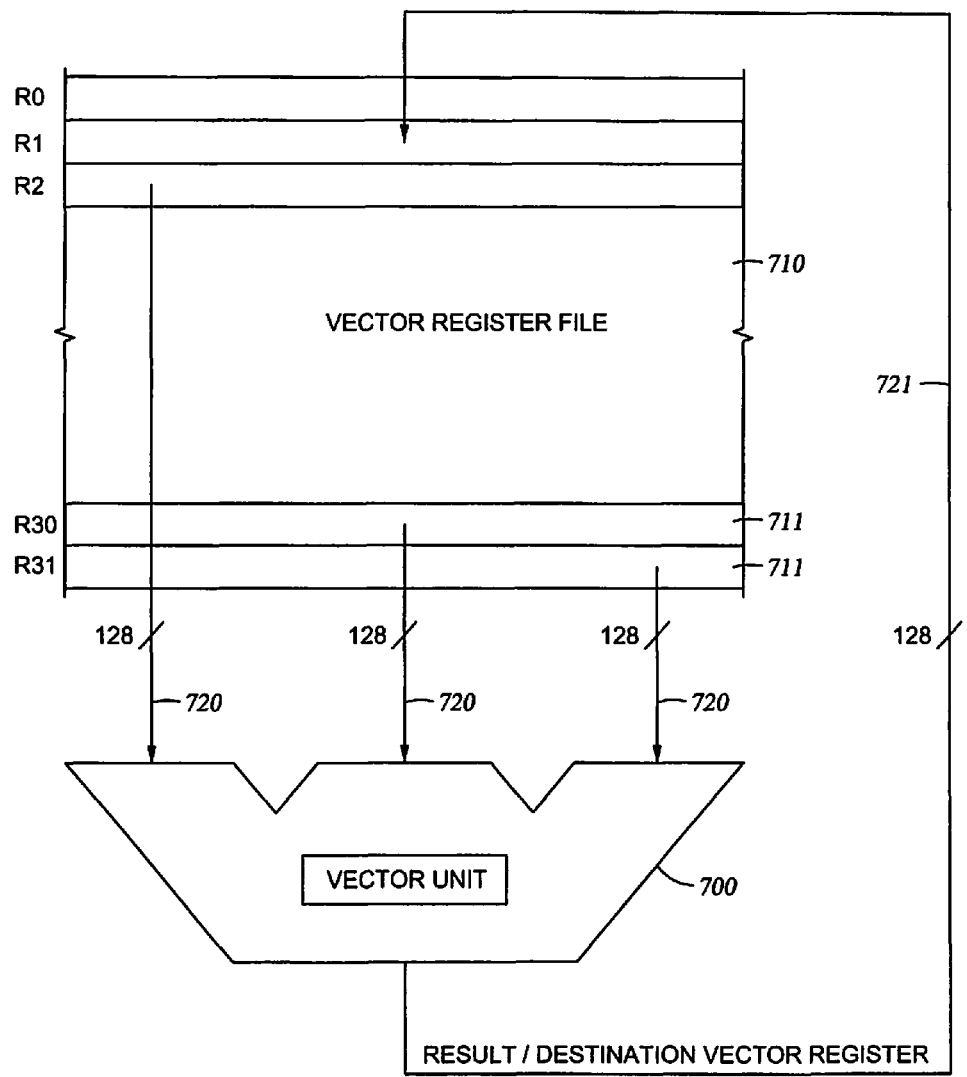
FIG. 7 illustrates a vector unit and a register file, according to an embodiment of the invention.

FIG. 7 illustrates an exemplary vector unit 700 and an associated register file 710. Vector unit 700 may be configured to execute single instruction multiple data (SIMD) instructions. In other words, vector unit 700 may operate on one or more vectors to produce a single scalar or vector result. For example, vector unit 700 may perform parallel operations on data elements that comprise one or more vectors to produce a scalar or vector result.

A plurality of vectors operated on by the vector unit may be stored in register file 710. For example, in FIG. 7, register file 710 provides 32 128-bit registers 711 (R0-R31). Each of the registers 711 may be organized in a manner similar to register 600 of FIG. 6. Accordingly, each register 711 may include vector data, for example, vector coordinates, pixel data, transparency, and the like. Data may be exchanged between register file 710 and memory, for example, cache memory, using load and store instructions. Accordingly, register file 710 may be communicably coupled with a memory device, for example, a Dynamic Random Access memory (DRAM) device and or a cache (SRAM) device.

A plurality of lanes 720 may connect register file 710 to vector unit 700. Each lane may be configured to provide input from a register file to the vector unit. For example, in FIG. 7, three 128 bit lanes connect the register file to the vector unit 700. In this manner, the contents of any 3 registers from register file 710 may be provided to the vector unit at a time.

The results of an operation performed by the vector unit may be written back to register file 710. For example, a 128 bit lane 721 provides a write back path to write results computed by vector unit 700 back to any one of the registers 711 of register file 710.

Figure 8:
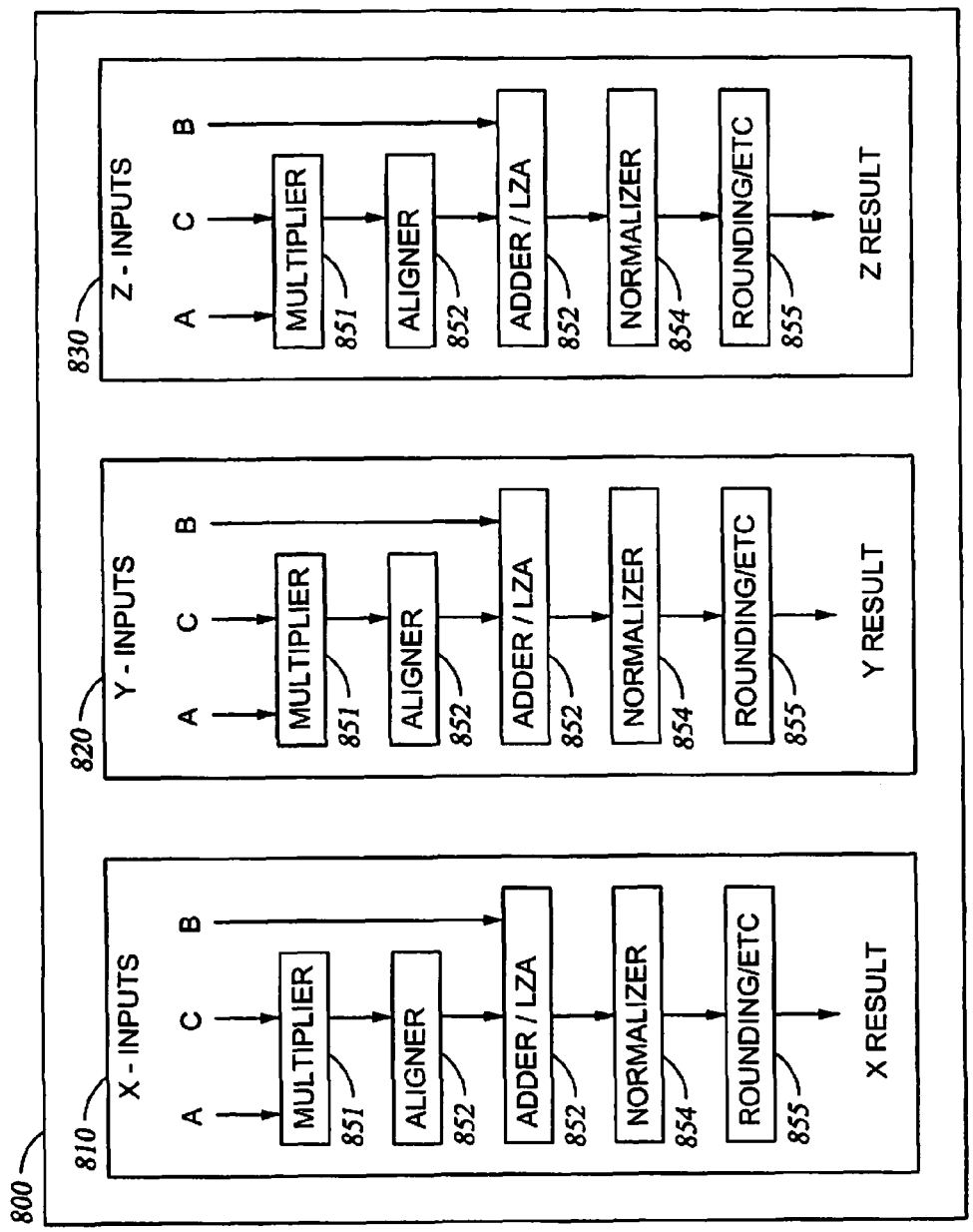
FIG. 8 illustrates a detailed view of a vector unit according to an embodiment of the invention.

FIG. 8 illustrates a detailed view of a vector unit 800. Vector unit 800 is an embodiment of the vector unit 700 depicted in FIG. 7. As illustrated in FIG. 8, vector unit 800 may include a plurality of processing lanes. For example, three processing lanes 810, 820, and 830 are shown in FIG. 8. Each processing lane may be configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

In one embodiment of the invention, one or more processing lanes of vector unit 800 may be configured to perform scalar operations. Therefore, vector unit 800 may be configured to perform both scalar and vector operations. For example, in one embodiment, vector unit 800 may include four processing lanes, wherein three processing lanes are configured to perform vector operations and one processing lane is configured to perform scalar operations.

Each processing lane may be pipelined to further improve performance. Accordingly, each processing lane may include a plurality of pipeline stages, with each stage performing one or more operations on the operands. For example, each vector lane may include a multiplier 851 for multiplying a pair of operands A and C. Operands A and C may be derived from one of the lanes coupling the register file with the vector unit, for example, lanes 720 in FIG. 7. In one embodiment of the invention, the multiplication of operands may be performed in a first stage of the pipeline as illustrated in FIG. 8.

Each processing lane may also include an aligner for aligning the product computed by multiplier 851. For example, an aligner 852 may be provided in each processing lane. Aligner 852 may be configured to adjust a decimal point of the product computed by a multiplier 851 to a desirable location in the result. For example, aligner 852 may be configured to shift the bits of the product computed multiplier 851 by one or more locations, thereby putting the product in desired format. While alignment is shown as a separate pipeline stage in FIG. 8, one skilled in the art will recognize that the multiplication and alignment may be performed in the same pipeline stage.

Each processing lane may also include an adder 853 for adding two or more operands. In one embodiment (illustrated in FIG. 8), each adder 853 is configured to receive the product computed by a multiplier, and add the product to another operand B. Operand B, like operands A and C, may be derived from one of the lanes connecting the register file to the vector unit. Therefore, each processing lane may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane may also include a normalizing stage and a rounding stage, as illustrated in FIG. 8. Accordingly, a normalizer 854 may be provided in each processing lane. Normalizer 854 may be configured to represent a computed value in a convenient exponential format. For example, normalizer may receive the value 0.0000063 as a result of an operation. Normalizer 854 may convert the value into a more suitable exponential format, for example, $6.3 \times 10^{-6}$. The rounding stage may involve rounding a computed value to a desired number of decimal points. For example, a computed value of 10.5682349 may be rounded to 10.568 if only three decimal places are desired in the result. In one embodiment of the invention the rounder may round the least significant bits of the particular precision floating point number the rounder is designed to work with.

One skilled in the art will recognize that embodiments of the invention are not limited to the particular pipeline stages, components, and arrangement of components described above and in FIG. 8. For example, in some embodiments, aligner 852 may be configured to align operand B, a product computed by the multiplier, or both. Furthermore, embodiments of the invention are not limited to the particular components described in FIG. 8. Any combination of the illustrated components and additional components such as, but not limited to, leading zero adders, dividers, etc. may be included in each processing lane.

In one embodiment of the invention, one or more vector units may be coupled with a register file. For example, in one embodiment, two vector units may be coupled with the register file. Each vector unit may be configured to independently and simultaneously process vector and scalar instructions. In one embodiment, one or more resources in a first vector unit may be shared with a second vector unit to process an instruction, for example, a cross product instruction.

Performing a Cross Product with a Single Vector Unit

Performing a cross product operation using a vector unit, for example, vector unit 800 may involve multiple instructions. For example, referring back to FIG. 5, a cross product operation requires six multiply operations and three subtraction operations. Because vector unit 800 includes three vector processing lanes with three multipliers, performing the cross product operation may involve multiple instructions.

FIG. 9 illustrates exemplary instructions for performing a cross product operation by issuing multiple instructions to the vector unit. Performing the cross product operation may involve issuing a plurality of permute instructions 901. The permute instructions may be configured to move the operands for performing the cross product operation into desired locations in desired registers of the register file. For example, the permute operations may transfer data from a first register to a second register. The permute instructions may also select a particular location, for example the particular word location (see FIG. 6), for transferring data from one register to another register. In one embodiment, the permute instructions may rearrange the location of data elements within the same register.

Once the operands are in the desired locations in the desired registers, a first instruction 902 may be issued to perform a first set of multiply operations. The first set of multiply operations may perform one or more of the 6 multiply operations required to perform a cross product operation. For example, in one embodiment, the first set of multiply operations may perform three out of the six multiply operations. The multiple operations may be performed in each of the three processing lanes of the vector unit. The results of the first set of multiply operation may be stored back in one or more registers of the register file.

Subsequently, a second instruction 903 may be issued to perform a second set of multiply operations. The second set of multiply operations may perform the remaining (three) multiply operations of the cross product not performed in the first set of multiply operations. In one embodiment, the second instruction may involve performing both the second set of multiple operations and the subtraction operations for completing the cross product operation.

For example, referring back to FIG. 8, operands A and C may be associated with operands for performing the second set of multiply operations. The results of the second set of multiply operations may be subtracted from the results of the first set of multiply operations, or vice versa. The results of the first set of multiply operations may be provided, for example, via operands B of FIG. 8, as an input to adder 853 for performing the subtraction operation.

As previously discussed, the instructions executed by the vector unit may be pipelined. Because dependencies may exist between the permute instructions 901, first multiply instruction 902, and second multiply instruction 903, one or more pipeline stages may be stalled. For example, the first multiply instruction may not be performed until the operands are moved into the proper locations in proper registers. Therefore, the first multiply instruction may not be performed until the completion of the permute instructions, thereby requiring pipeline stalls. Similarly, because the second multiply instruction may utilize the results from the first multiply instruction, the second multiply instruction may not be executed until the completion of the first multiply instruction, thereby requiring pipeline stalls between the first multiply instruction and the second multiply instruction.

FIG. 10 illustrates executions of instructions 901, 902, and 903 in a pipeline. For purposes of illustration, execution of each instruction is assumed to be 4 clock cycles long. However, one skilled in the art will recognize that execution of instructions may take any number of clock cycles. Furthermore, the number of clock cycles for execution may differ between instructions.

As illustrated in FIG. 10, the execution of a first permute instruction 901a may begin in the first clock cycle (CC1) and end in CC4. Similarly, execution of instruction 901b may begin in CC2 and end in CC5, execution of instruction 901c may begin in CC3 and end in CC6, and execution of instruction 901d may begin in CC4 and end in CC7.

Execution of instruction 902 may begin in CC6 instead of CC5 because instruction 902 may depend on instruction 901b. For example, permute instruction 901b accesses register $v_3$, which is also accessed by instruction 902. Therefore, execution of instruction 902 may be stalled in CC5 to allow execution of instruction 901b to be completed. One skilled in the art will recognize that instruction 902 may depend on any one of permute instructions 901a-901d. The number of stalls required before execution of instruction 902 begins may depend on the particular instruction on which instruction 902 depends. For example, if instruction 902 depends on instruction 901d, execution of instruction 902 may be stalled from CC5-CC7.

Therefore, as illustrated in FIG. 10, in the best case scenario, execution of the cross product operation may begin in CC6 because of the permute instructions required to arrange operands in the appropriate locations in the registers and pipeline stalls required to address dependencies between instructions. In the worst case scenario, execution of the cross product operation may begin in CC8.

FIG. 10 also illustrates stalling of the pipeline between the first multiply instruction 902 and the second multiply instruction 903. The stalling of the pipeline between the first multiply instruction and the second multiply instruction may be performed to allow the results of the first multiply instruction to be available to the second multiply instruction. Therefore, as illustrated in FIG. 10, the second multiply instruction may not enter the pipeline until execution of the first multiply instruction 902 is completed.

Swizzle Instruction for Rearranging Operands

In some embodiments of the invention, a level of multiplexing may be provided between the register file and the vector unit to rearrange contents of a source register. Operand multiplexors (muxes) may rearrange the order in which operands of a register are provided to a particular lane of the vector unit, thereby avoiding the need for permute instructions. A swizzle instruction may be provided to set the mux controls prior to transferring register contents from the register file to the vector unit.

Figure 11A:
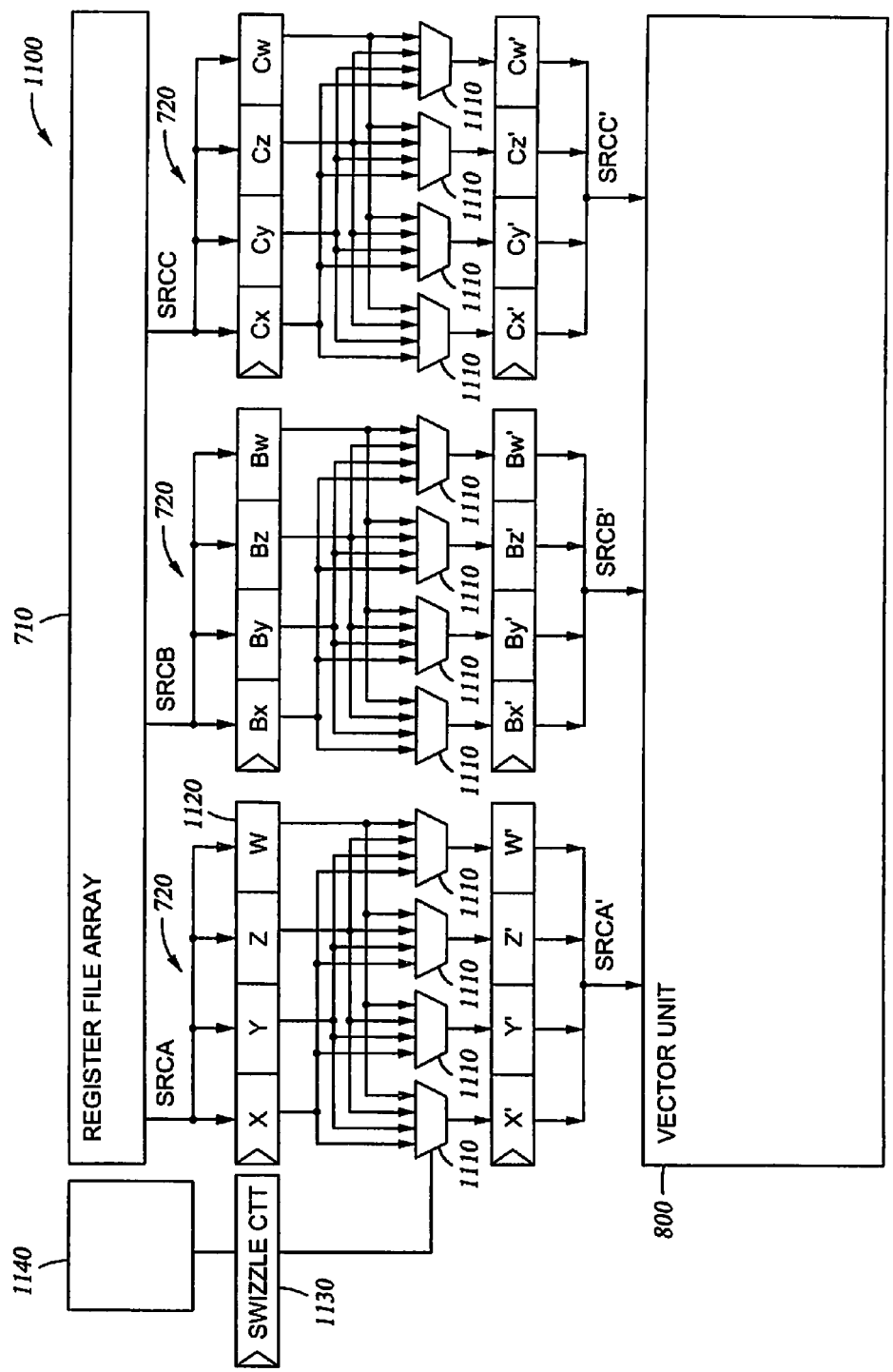
FIG. 11A illustrates an exemplary system according to an embodiment of the invention.

FIG. 11A illustrates an exemplary system 1100 in which embodiments of the invention using a swizzle instruction may be implemented. As illustrated, system 1100 may include a register file 710, a vector unit 800, a plurality of multiplexors (muxes) 1110, swizzle controller 1130, and issue logic 1140. Issue logic 1140 may control the issue of instruction to vector unit 800. The plurality of muxes 1110 may be associated with each lane 720 transferring register contents from register file 710 to vector unit 800 (See FIG. 7). Muxes 1110 may be configured to rearrange the order of operands in a register prior to transferring the register contents to vector unit 800.

For example, as illustrated in FIG. 11A, each operand from a register 1120 may be provided to each associated mux 1110. Each mux 1110 may select one of the operands received from register 1120 and transfer the selected operand to the vector pipeline, thereby allowing the rearrangement of the operands in register 1120. For example, register 1120 has an initial order of operands X, Y, Z, W. Each of the operands X, Y, Z, and W may be provided to each mux 1110. Each mux 1110 may select one of the operands, thereby rearranging the operands to a different desired order X', Y', Z', W'. Each of operands X', Y', Z', and W' may be any one of operands X, Y, Z, or W. FIG. 11B illustrates exemplary combinations of operands X, Y, W, and Z, that may represent operands X', Y', Z', and W' sent to the vector unit. Swizzle controller 1130 may be configured to select any one of the combinations of operands X, Y, Z, and W illustrated in FIG. 11B. One skilled in the art will recognize, however, that the combinations of operands are not limited to the ones disclosed in FIG. 11B. In some embodiments, swizzle controller 1130 may select one of operands X, Y, Z, or W to represent one or more of operands X', Y', W', and Z'. For example, one possible combination in FIG. 11B may be X, X, X, Y.

Figures 12, 13:
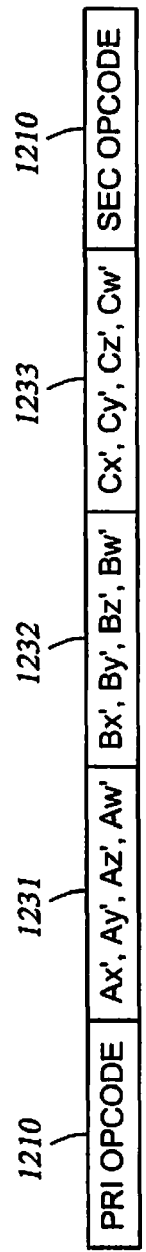
FIG. 12 illustrates a swizzle instruction according to an embodiment of the invention.
FIG. 13 illustrates pipelined execution of another instruction stream for performing a cross product operation, according to an embodiment of the invention.

A swizzle instruction may be provided to set latches controlling the muxes (in swizzle controller 1130) prior to transferring contents of a register to the vector unit. FIG. 12 illustrates an exemplary swizzle instruction 1200 according to an embodiment of the invention. As illustrated in FIG. 12, swizzle instruction 1200 may include one or more opcode fields 1210. For example, two opcode fields, primary opcode and secondary opcode are shown in swizzle instruction 1200. The opcode fields 1210 may be configured to identify an instruction as a swizzle instruction.

Swizzle instruction 1200 may also include one or more operand selection fields. For example, three operand selection fields 1231-1233 are illustrated. Each operand selection field may be associated with a mux 1110 of FIG. 11A, and may set latches to determine selection of operands by the mux 1110. For example, in one embodiment, each of operand selection fields 1231-1233 may include 4 bits. Each of the 4 bits may be associated with an operand of an input register. For example, a first bit may be associated with the operand in the word 0 location of a register 1120, a second bit may be associated with the word 1 location of a register 1120, a third bit may be associated with the word 2 location of a register 1120, and a fourth bit may be associated with the word 3 location of a register 1120.

The enablement of one of the four bits in an operand selection field may set latches controlling mux 1110 to allow selection of an operand associated with the bit. A bit may be selected, for example, by setting the bit to logic "1". One skilled in the art will recognize, however, that bit enablement may also be achieved by setting the bit to logic "0". For example, in one embodiment, the second bit may be enabled in operand selection field 1231, thereby selecting the operand in the word 1 location of register 1120. Therefore, the mux may transfer the operand in the word 1 location of an input register 1120 to the vector unit. The operand selection fields 1231-1233 of a swizzle instruction may set the controls for each mux 1110 such that a desired rearrangement of the operands in a register, for example, from X, Y, Z, W to X', Y', Z', W' may be achieved.

In another embodiment of the invention, each operand selection field may include two bits. The two bits may determine which a word location in register 1120 is selected. For example, '00' may select the word 0 location, '01' may select the word 1 location, '10' may select the word 2 location, and '11' may select the word 3 location in register 1120. In one embodiment, each of operand selection fields 1231-1233 may be 8 bits wide. Each operand selection field 1231-1233 may determine rearrangement of vector operands for a particular lane 720 connecting a register file 710 to a vector unit 800. Each operand selection field 1231-1233 may include four 2 bit fields for selecting one of four operands in a register. For example, referring to FIG. 12, operand selection field 1231 includes four 2 bit fields, Ax', Ay', Az', and Aw'. The Ax' field may determine, for example, operand X', Ay' may determine operand Y', Az' may determine operand Z', and Aw' may determine operand W' transferred from a register to the vector unit for a particular lane 720.

One skilled in the art will recognize that embodiments of the invention are not limited to the word selection schemes described herein. More generally, any reasonable means for selecting a location in register 1120 may be used. Furthermore, selected locations are not limited to word locations. For example, selection of half word and byte locations is also contemplated.

In one embodiment of the invention, the swizzle instruction may occupy the same amount of instruction memory as other instructions, for example, vector instructions and scalar instructions. Accordingly, the swizzle instruction may be treated as a normal instruction during instruction caching, buffering, dependency stalling, issue, and the like.

In one embodiment, the swizzle instruction may set the latches controlling muxes 1110, but may not continue down the vector pipeline or occupy a pipeline stage, thereby avoiding any potential dependencies between the swizzle instruction and a following vector or scalar instruction. Therefore, vector and scalar instructions may always be issued in the clock cycle immediately following the clock cycle in which an associated swizzle instruction is issued.

Referring back to FIG. 11A, Swizzle controller 1130 may be provided to control the setting and clearing of latches determining operand selection by the muxes 1110 based on the operand selection fields of a swizzle instruction. For example, in one embodiment, a swizzle instruction may precede each vector instruction requiring rearrangement of register operands. Accordingly, issue logic 1140 may be configured to issue a swizzle instruction prior to issuing an associated vector or scalar instruction. Swizzle controller 1130 may receive instructions from issue logic 1140 and set latches controlling the muxes based on operand selection bits in a received swizzle instruction to achieve a desired rearrangement of operands of a register.

Issue logic 1140 may issue a vector or scalar instruction after issuing an associated swizzle instruction. For example, in one embodiment, issue logic 1140 may issue the vector or scalar instruction in a clock cycle following the swizzle instruction. In one embodiment, issue logic 1140 may issue the vector or scalar instruction in the clock cycle immediately following the clock cycle in which an associated swizzle instruction is issued.

A swizzle instruction need not be issued before every vector and scalar instruction. For example, it may be desirable to transfer register contents in the natural order, for example X, Y, Z, W, to the vector unit. If a swizzle instruction is not issued prior to the issue of a vector or scalar instruction, the muxes 1110 may be configured to transfer register contents in the natural order. In one embodiment, swizzle controller 1130 may be configured to clear the latches controlling the muxes after the vector or scalar instruction is issued. Clearing the latches may set each mux to select a default operand from the register. For example, in one embodiment, the default selection may select the natural order of operands (X, Y, Z, W) in a register.

In one embodiment of the invention, swizzle controller 1130 may be configured to clear the latches controlling mux selections when a flush of the pipeline occurs. A flush of the pipeline may occur due to asynchronous interrupts, or any other reason, for example, encountering branch and jump instructions. In one embodiment, an interrupt handler may handle an interrupt and return processing to the code executing prior to encountering the interrupt. In such instances, issue logic 1140 may begin execution at or before a swizzle instruction executing at the time the interrupt occurs. This ensures that the swizzle instruction is always executed before an associated vector or scalar instruction executes, thereby avoiding erroneous execution of arithmetic instructions.

FIG. 13 illustrates the execution of instructions performing a dot product operation in a pipeline, according to an embodiment of the invention. The instructions may include, for example, instructions 902 and 903 illustrated in FIGS. 9 and 10. As illustrated in FIG. 13, performing a dot product operation may involve issuing a first swizzle instruction 1302 in CC1. Swizzle instruction 1302 may be associated with instruction 902 and may set mux controls for rearranging contents of registers associated with instruction 902. For example, in one embodiment, swizzle instruction 1302 may set mux controls to rearrange contents of registers $v_1$ and $v_2$, associated with instruction 902.

Subsequently, in CC2, instruction 902 may be issued and may execute for four clock cycles (CC2-CC5). At the time of issue of instruction 902, swizzle controller 1130 may allow transfer of register contents to the vector pipeline according to the mux controls set by swizzle instruction 1302. After the register contents are transferred, mux controller 1130 may clear the latches controlling the mux selections.

Swizzle instruction 1303 may be associated with instruction 903, and as illustrated in FIG. 13, may be issued in CC3. Swizzle instruction 1303 may set the latches for rearranging registers associated with instruction 903, for example, registers $v_5$, $v_9$, and $v_7$. Because instruction 903 depends on instruction 902, however, execution of instruction 903 may not begin until CC6.

Comparing FIGS. 10 and 13, the benefits of implementing swizzle instructions may become apparent. As described above, swizzle instructions obviate the need for issuing permute instructions, thereby avoiding execution of the permute instructions in the instruction pipeline and reducing potential dependencies between instructions. For example, referring to FIG. 10, execution of instruction 902, in the best case scenario began in CC6, and execution of instruction 903 began in CC10. However, in FIG. 13, execution of instruction 902 began in CC2 and execution of instruction 903 began in CC 6. Therefore, implementing swizzle instructions significantly improves performance by reducing the number of instructions issued to the vector pipeline and reducing dependencies between instructions.

Furthermore, using permute instructions may involve the use of temporary registers, as indicated by permute instructions 901 in FIG. 9. By avoiding permute instructions, excessive use of registers in the register file may be reduced, thereby making the registers available for other operations and/or reducing the size of the register file.

Figure 14:
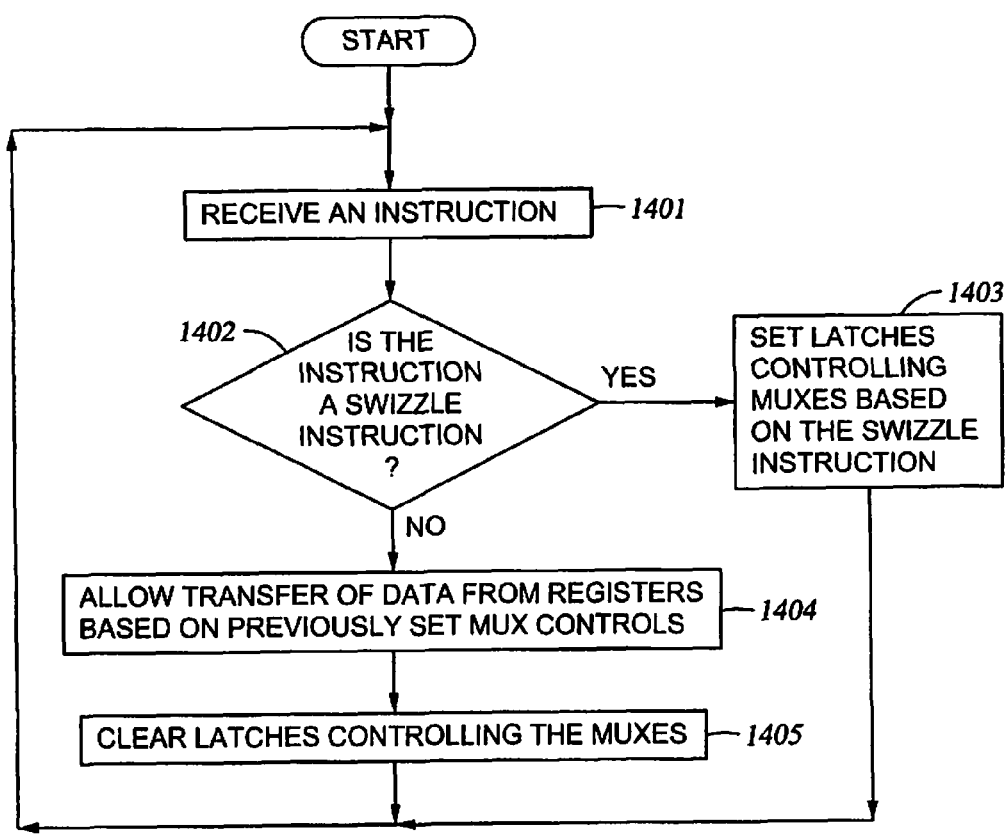
FIG. 14 is a flow diagram of exemplary operations performed by a swizzle controller to rearrange operands in a register, according to an embodiment of the invention.

FIG. 14 is a flow diagram of exemplary operations performed by the swizzle controller to set and clear latches controlling the muxes 1110. The operations begin in step 1401 by receiving an instruction from issue logic 1140. In step 1402, swizzle controller 1130 may determine whether the instruction is a swizzle instruction. If it is determined that the instruction is a swizzle instruction, swizzle controller 1130 may set latches controlling the muxes 1110, in step 1403 based on, for example, the operand selection bits 1231-1233 of contained in the swizzle instruction.

If, however, it is determined that the instruction is not a swizzle instruction, the swizzle controller may allow the transfer of data from register file 710 to the vector unit 800. The swizzle controller may allow the transfer of data through the muxes based on mux controls set by a previously issued swizzle instruction. After the instruction is issued, in step 1405, swizzle controller 1405 may clear the latches controlling the muxes, thereby setting the latches to transfer data from registers in the natural order.

CONCLUSION

By allowing issue of swizzle instructions to set mux controls that rearrange the order of operands in a register, embodiments of the invention obviate the need for permute instructions. Furthermore, because permute instructions are no longer needed, excessive use of registers in the register file and the dependencies between instructions are also significantly reduced. Therefore, performance is enhanced.

While the foregoing is directed to embodiments of the present invention, other and further embodiments of the invention may be devised without departing from the basic scope thereof, and the scope thereof is determined by the claims that follow.

What is claimed is:

1. A method of executing instructions, comprising:
   issuing a swizzle instruction configured to set controls of one or more multiplexors coupled with a register file and a vector unit, wherein the setting of the controls of the one or more multiplexors is configured to determine an arrangement of content in one or more registers providing input to the vector unit, and wherein the swizzle instruction is executed without issuing individual permute instructions corresponding to each of the one or more registers; and
   issuing a separate arithmetic instruction, wherein contents of registers associated with the arithmetic instruction are rearranged by the one or more multiplexors during transfer from the register file to the vector unit based on the setting of the controls of the one or more multiplexors, as set by the swizzle instruction.

2. The method of claim 1, wherein the swizzle instruction comprises a plurality of content selection fields, wherein each content selection field is associated with one of the multiplexors and determines the content of a register selected by the multiplexor for transfer to the vector unit.

3. The method of claim 1, further comprising:
   if the content of the registers associated with the arithmetic instruction require rearrangement, issuing the swizzle instruction prior to issuing the arithmetic instruction; and
   if the contents of the registers associated with the arithmetic instruction do not require rearrangement, issuing the arithmetic instruction without issuing the swizzle instruction.

4. The method of claim 1, wherein the swizzle instruction does not flow down an execution pipeline associated with the vector unit.

5. The method of claim 1, wherein the swizzle instruction occupies the same amount of instruction memory as the arithmetic instruction.

6. The method of claim 1, wherein the arithmetic instructions comprise vector instructions and scalar instructions.

7. The method of claim 1, wherein the swizzle instruction is executed in a single clock cycle, and wherein the separate artithmetic instruction is issued in the clock cycle immediately following the clock cycle in which the swizzle instruction is issued.

8. A controller configured to receive instructions comprising swizzle instructions and arithmetic instructions, each swizzle instruction being associated with a respective separate arithmetic instruction, wherein:
   upon determining that the instruction is a swizzle instruction, the controller is configured to set controls of one or more multiplexors coupled with a register file and a vector unit, wherein the setting of the controls of the one or more multiplexors is configured to determine an arrangement of content in one or more registers providing input to the vector unit, and wherein the swizzle instruction is executed without issuing individual permute instructions corresponding to each of the one or more registers; and
   upon determining that the instruction is an arithmetic instruction, the controller is configured to allow transfer of contents of registers associated with the arithmetic instruction to the vector unit, wherein the contents are rearranged by the one or more multiplexors during transfer of the contents from the register file to the vector unit based on the setting of the controls of the one or more multiplexors, as set by the swizzle instruction.

9. The controller of claim 8, wherein the controller is further configured to clear the setting of the multiplexor controls after transferring contents of the registers associated with the arithmetic instruction to the vector unit, wherein clearing the setting comprises setting the one or more multiplexors to transfer contents of registers from the register file to the vector unit in an order in which the contents are arranged in the registers.

10. The controller of claim 8, wherein the swizzle instruction comprises a plurality of content selection fields, wherein each content selection field is associated with one of the multiplexors and determines the content of a register selected by the multiplexor for transfer to the vector unit.

11. The controller of claim 8, wherein the swizzle instruction is processed by the controller prior to processing an associated arithmetic instruction.

12. The controller of claim 8, wherein the swizzle instruction occupies the same amount of instruction memory as the arithmetic instruction.

13. The controller of claim 8, wherein the arithmetic instructions comprise vector instructions and scalar instructions.

14. A system comprising a plurality of processors communicably coupled with one another, wherein each processor comprises:
   a register file comprising a plurality of registers;
   at least one vector unit for executing arithmetic instructions;
   one or more multiplexors coupled with the register file and the at least one vector unit, wherein the multiplexors are configured to transfer contents of one or more registers in the register file to the at least one vector unit; and a controller configured to receive swizzle instructions and arithmetic instructions, each swizzle instruction being associated with a respective separate arithmetic instruction, wherein:

upon determining that the instruction is a swizzle instruction, the controller is configured to set controls of the one or more multiplexors, wherein the setting of the controls of the one or more multiplexors is configured to determine an arrangement of content in one or more registers providing input to the vector unit, and wherein the swizzle instruction is executed without issuing individual permute instructions corresponding to each of the one or more registers; and upon determining that the instruction is an arithmetic instruction, the controller is configured to allow transfer of contents of registers associated with the arithmetic instruction to the vector unit, wherein the contents are rearranged by the one or more multiplexors during transfer of the contents from the register file to the vector unit based on the setting of the controls of the one or more multiplexors, as set by the swizzle instruction.

15. The system of claim 14, wherein the controller is further configured to clear the setting of the controls of the one or more multiplexors after transferring contents of the registers associated with the arithmetic instruction to the vector unit, wherein clearing the setting comprises setting the one or more multiplexors to transfer contents of registers from the register file to the vector unit in an order in which the contents are arranged in the registers.

16. The system of claim 14, wherein the swizzle instruction comprises a plurality of content selection fields, wherein each content selection field is associated with one of the multiplexors and determines the content of a register selected by the multiplexor for transfer to the vector unit.

17. The system of claim 14, wherein the swizzle instruction is processed by the controller prior to processing an associated arithmetic instruction.

18. The system of claim 14, further comprising issue logic for issuing the swizzle instructions and the arithmetic instructions to the processors, wherein if the content of the registers associated with the arithmetic instruction require rearrangement, issuing the swizzle instruction prior to issuing the arithmetic instruction; and if the contents of the registers associated with the arithmetic instruction do not require rearrangement, issuing the arithmetic instruction without issuing the swizzle instruction.

19. The system of claim 18, wherein the issue logic is further configured to initiate execution of instructions at or before a swizzle instruction associated with a first arithmetic instruction to be processed by a processor if a pipeline associated with the processor is flushed.

20. The system of claim 14, wherein the swizzle instruction occupies the same amount of instruction memory as the arithmetic instruction.

21. The system of claim 14, wherein the arithmetic instructions comprise vector instructions and scalar instructions.

* * * * *